July 16, 1957 V. H. BUSH ET AL 2,799,431
GRAIN BIN CLOSURE WITH DETACHABLE HOPPER
Filed May 13, 1955 2 Sheets-Sheet 1

Victor H. Bush
Lewis G. Wicks
INVENTORS

BY *Clarence A. O'Brien*
*and Harvey B. Jacobson*
Attorneys

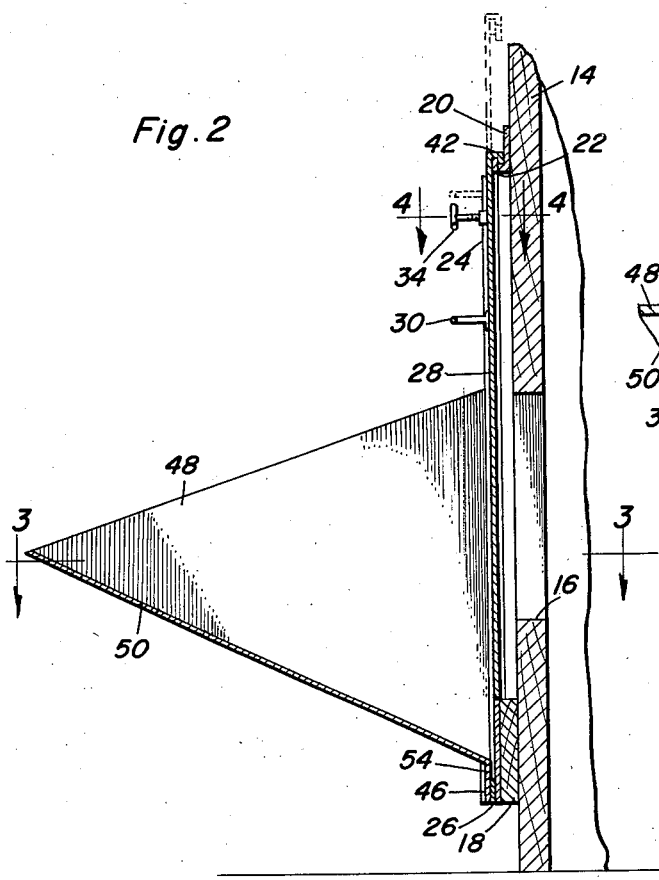
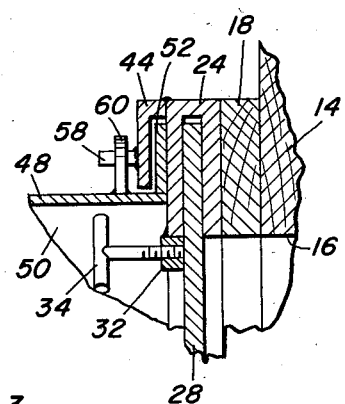
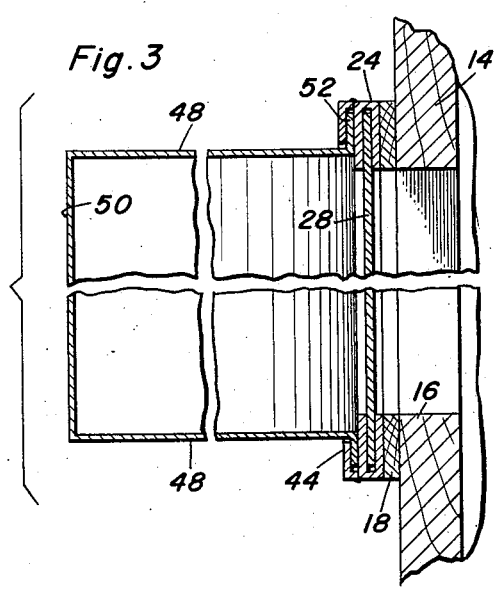

United States Patent Office 2,799,431
Patented July 16, 1957

2,799,431
GRAIN BIN CLOSURE WITH DETACHABLE HOPPER

Victor H. Bush and Lewis G. Wicks, Rolla, N. Dak.

Application May 13, 1955, Serial No. 508,210

1 Claim. (Cl. 222—108)

This invention generally relates to a grain bin closure having a detachable hopper associated therewith wherein the grain bin closure is weather-proof and the hopper may be detached for use in conjunction with a selected one of several grain bin closures.

When it is desired to remove grain or similar material from bins and place it in receptacles such as trucks or the like, it is common practice to use a grain conveying or elevating means for conveying material from the doorway of the bin into the receptacle. The usual doors provided on bins permitted considerable wastage of the grain and also permitted some leakage of water onto the grain while stored which causes damage to the grain. Accordingly, it is the primary object of the present invention to provide a grain bin closure together with a hopper detachably connected thereto for use in association with an auger-type conveyor which may be inserted into the grain bin for removal thereof.

Another object of the present invention is to provide a device of the character described in accordance with the preceding object in which the closure is maintained in a water-tight or weather-tight condition thereby eliminating damage to the grain normally caused by water seepage.

A further important object of the present invention is to provide a grain bin closure with detachable hopper wherein the closure may be provided on several bins and the hopper easily detached from one and attached to the other thereby permitting a single hopper to be employed in removing the grain from several bins.

Other important objects of the present invention will reside in its simplicity of construction, ease of operation, adaptation for its particular purposes and its relatively inexpensive manufacture and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a longitudinal, vertical sectional view taken substantially upon a plane passing along section line 2—2 of Figure 1 illustrating the details of construction thereof;

Figure 3 is a plan sectional view taken substantially upon a plane passing along section line 3—3 of Figure 2 illustrating the details of construction of the channel guides and the position of the elements of the invention;

Figure 4 is a detailed sectional view taken substantially upon a plane passing along section line 4—4 of Figure 2 illustrating the means for locking the closure plate in adjusted position and the means for detachably retaining the side walls of the hopper in predetermined relation;

Figure 5 is a detailed view illustrating the detachable link in the chain construction permitting the closure plate to be raised vertically to an open position.

Figure 1:
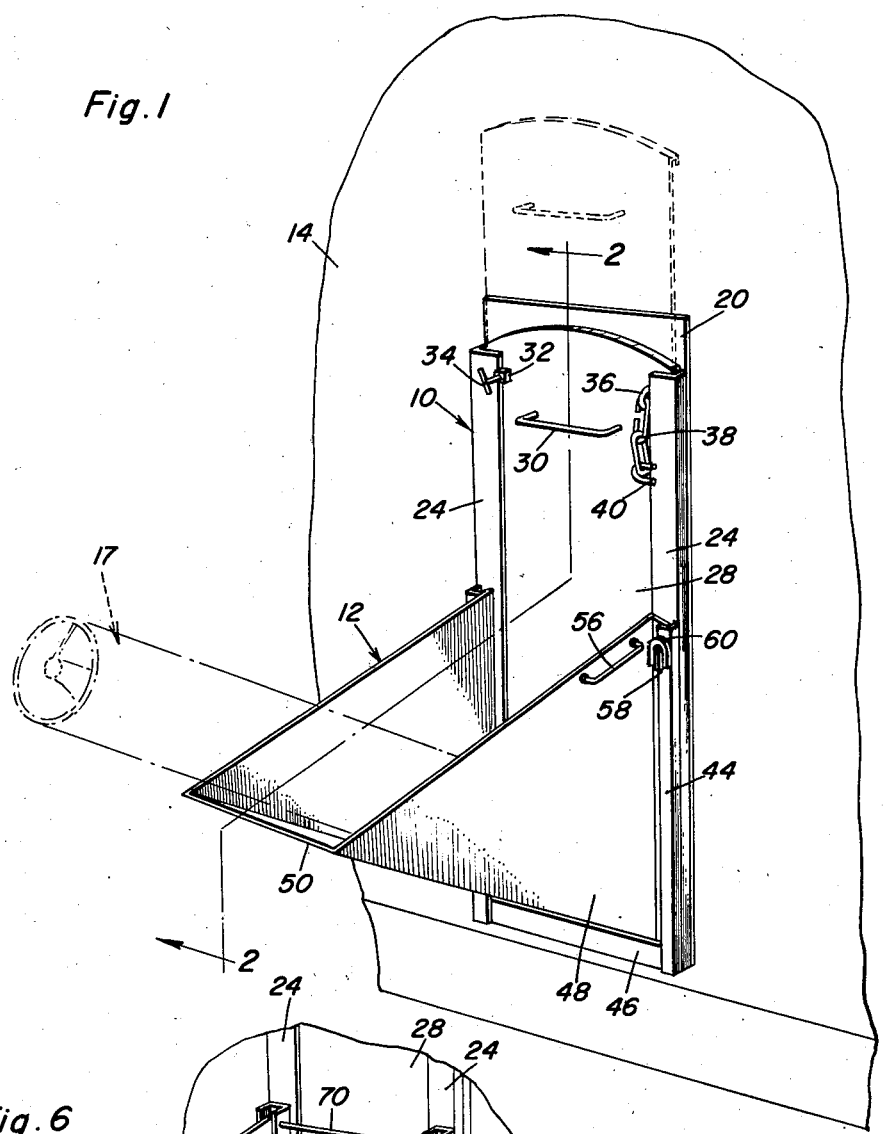
Figure 1 is a perspective view of the grain bin closure of the present invention with the hopper attached thereto and illustrating the auger and conveyor in dotted lines.

Referring now specifically to the drawings, it will be seen that the numeral 10 generally designates the grain closure bin of the present invention for use in association with a grain hopper generally designated by the numeral 12 for attachment to a grain bin wall 14 having a discharge opening 16 therein wherein a discharge auger generally designated by the numeral 17 is provided for insertion into the interior of the grain bin for removing the grain outwardly through the discharge opening 16 in the wall 14.

Referring now specifically to the drawings, it will be seen that the closure for the grain bin includes a generally U-shaped filler plate 18 which is in encircling relation to the discharge aperture 16 and may be so curved to adapt the grain bin closure 10 for use in circular or cylindrical buildings whereby the outer face of the adapter or filler plate 18 will be flat. The filler plate 18 is generally annular and provided with a metallic curved transverse cross-member 20 at the upper end thereof which terminates in an upwardly facing channel 22 which is provided with a convex upper surface wherein water will be drained to either side of the discharge opening 16.

Secured to the outer surface of the filler plate 18 is a pair of vertically disposed inwardly facing channel members 24 interconnected by a transverse plate 26 which interconnects the outer legs of the facing channel members 24.

Slidably received in the vertical guides formed by the vertical channel members 24 is an elongated closure plate 28 which projects downwardly to the bottom edge of the filler plate 18 wherein the bottom of the filler plate extends between the inner flanges of the facing channels 24 thereby forming substantially a seat or a seal for the inner face of the closure plate 28. The transverse member 26 engages the outer surface of the closure plate 28 for retaining it against the outer face of the filler plate 18. Disposed centrally adjacent the upper end of the plate 28 is a U-shaped handle member 30 and attached to the inner edge of the outer leg of one of the channel shaped members 24 is an internally threaded lug 32 having a T-bolt 34 threaded therethrough for contacting engagement with the front surface of the plate 28 wherein the plate 28 may be locked in vertical adjusted position. In opposition to the lug 32 is an eye member 36 secured to the plate 28 to which is attached a chain 38 that is connected at its other end to an eye member 40 wherein a suitable lock, not shown, may be employed for locking the chain to the plate 28 thereby locking the plate 28 in closed position and preventing unauthorized opening thereof.

The upper end of the plate 28 is provided with an inwardly extending flange which defines a downwardly opening channel 42 which is in opposition to the upwardly opening channel 22 on the transverse plate 20 and is in interlocking engagement therewith. The end of the plate 28 is curved in conformance to the channel 22 wherein the plate 28 will be sealed in relation to the plate 20 thereby sealing the upper end of the plate 28 to the wall 14 of the grain bin thereby assuring the sealing relationship of the plate 28 to the discharge opening 16 to prevent damage to the grain in the grain bin by water seepage or the like.

Secured to the outer surface of the inwardly facing channel shaped members 24 is a pair of oppositely disposed elongated angle iron members 44 which define vertical guides in spaced parallel relation. A transverse member 46 interconnects the outer edges of the members 44 thereby forming a closure for the lower end of the vertical guide formed by the angle iron members 44.

The hopper 12 includes a pair of vertical side walls 48 together with an inclined bottom wall 50. The vertical side walls 48 are provided with outwardly directed flanges 52 slidably received within the guides formed by the angle iron members 44. The bottom wall 48 is provided with a depending flange 54 which abuts the upper surface of the transverse member 46 for forming a limit for the insertion of the flanges 52 in the vertical guides formed by the angle iron members 44.

The side walls 48 of the hopper 12 are provided with handle members 56 for raising and lowering thereof and an upwardly facing hook 58 is provided on the outer surface of each of the angle iron members 44 and a downwardly opening hook 60 is provided on each of the vertical side walls 48 for interlocking engagement thereby preventing inward displacement of the vertical side walls 48 thereby assuring the proper positioning of the hopper 12 in relation to the vertical guides retaining it in position.

Figure 6:
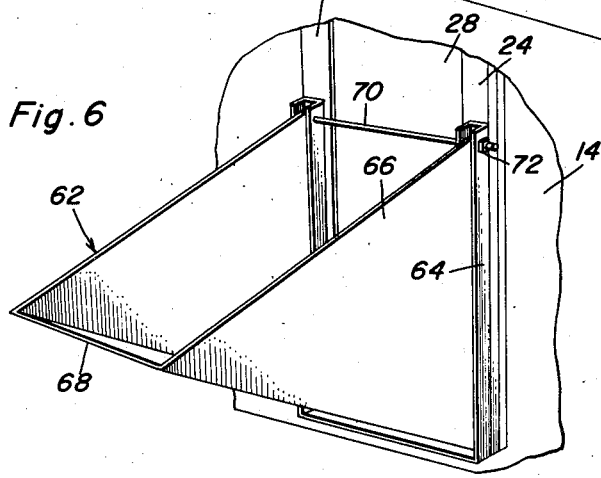
Figure 6 is a perspective view illustrating a modified form of the invention wherein the hopper may be hingedly connected to the grain closure bin.

Referring now specifically to Figure 6, it will be seen that the numeral 62 illustrates a modified form of the present invention wherein outwardly directed channel-shaped members 64 are secured to the upper surface of the channels 24. A hopper having side walls 66 and an inclined bottom wall 68 is pivotally secured between the adjacent legs of the channel-shaped members 64 by an elongated transverse pivot pin 70 having a threaded nut 72 on one end thereof whereby the hopper may pivot upwardly to an inoperative position and be removed by removal of the pivot pin 70 in an obvious manner. Otherwise, the structure of Figure 6 is identical to that illustrated in Figures 1–5.

If desired, the channel members 24 are provided with an inwardly extending flange for engagement with the inner periphery of the opening 16 in the bin wall 14 thereby preventing any leakage of grain through openings in the siding.

In operation, the closure plate 28 may be adjusted or raised to any desired position thereby permitting insertion of the auger 17 with no accidental storage and wastage of the grain. Also, the sealed relation eliminates damage to the grain caused by water and the auger 17 may be positioned at varying distances within the grain bin for removing more of the grain thereby eliminating the necessary shoveling of residual grain in inaccessible areas of the bin.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A closure for communicating openings in one side of a bin and a hopper respectively, comprising a U-shaped filler plate attachable to a bin at opposite sides of an opening in said bin and having a top cross member provided with an arched upwardly opening channel, a pair of vertical channel guides attached to said filler plate at opposite sides of said opening in said bin, a closure plate slidable in said guides to close said bin opening and having an arched flange fitting in said groove, said channel and arched flange forming a seal at the top of the closure plate and draining moisture to the sides of the closure plate, and a pair of cross connected angle bars attached to said channel guides longitudinally thereof and forming therewith a second pair of guides for receiving side flanges on an open end of said hopper to suspend said hopper for closing of its open end by said closure plate simultaneously with closing of said opening in said bin.

References Cited in the file of this patent

UNITED STATES PATENTS

| | | |
|---|---|---|
| 779,128 | Mummy et al. | Jan. 3, 1905 |
| 878,443 | Young | Feb. 4, 1908 |
| 1,630,538 | Micallef | May 31, 1927 |
| 1,942,617 | Saurbrey | Jan. 9, 1934 |
| 2,745,573 | Fuller | May 15, 1956 |